United States Patent [19]

Bergström et al.

[11] 3,764,703

[45] Oct. 9, 1973

[54] AMINO ACID MIXTURE FOR USE IN TREATMENT OF UREMIC CONDITIONS

[75] Inventors: Lars Jonas Bergström, Ekero; Nils Härje Bucht, Gothenburg; Erik Helmer Hultman, Viggbyholm; Bertil August Josephson; Erik Vinnars, both of Stockholm; David Georg Dahlinder, Sodertalje; Peter Fürst, Sollentuna, all of Sweden

[73] Assignee: Aktiebolag Astra, Sodertalje, Sweden

[22] Filed: Nov. 3, 1970

[21] Appl. No.: 86,625

Related U.S. Application Data

[63] Continuation-in-part of Ser. No. 820,638, April 30, 1969, abandoned.

[30] Foreign Application Priority Data

Nov. 7, 1969   Sweden............................... 15280/69

[52] U.S. Cl. ................................................ 424/319
[51] Int. Cl............................................. A61k 27/00
[58] Field of Search ..................................... 424/319

[56] References Cited
UNITED STATES PATENTS 3,080,234   3/1963   Jarowski............................ 424/319

Primary Examiner—Sam Rosen
Attorney—Brumbaugh, Graves, Donohue & Raymond

[57] ABSTRACT

A mixture intended for nitrogen nutrition is disclosed which contains as a source of nitrogen a mixture of essential amino acids optionally combined with certain semi-essential amino acids. The mixture may be administered in either tablet or solution form to the patient and causes a lowering in blood urea nitrogen in combination with a positive nitrogen accumulation.

34 Claims, No Drawings

AMINO ACID MIXTURE FOR USE IN TREATMENT OF UREMIC CONDITIONS

The present application is a continuation-in-part of our earlier copending U.S. application, Ser. No. 820,638, filed Apr. 30, 1969, now abandoned.

The present invention relates to a therapeutic mixture containing amino acids possibly in combination with one or both of the semi-essential amino acids L-arginine and L-histidine, which may be administered to a patient in either tablet or solution form. The invention also relates to a process for the preparation of such tablets and solutions and a method for the treatment of uremic conditions which are caused by renal insufficiency.

In one embodiment the present invention relates to infusion solutions intended for intravenous nitrogen nutrition in which the source of nitrogen comprises essential amino acids optionally combined with one or both of the semiessential amino acids L-arginine and L-histidine. The invention also includes a process for the preparation of such solutions and a method for the treatment of uremic conditions caused by renal insufficiency by administering the solutions.

Attempts have been made to give nitrogen nutrition to uremic patients by means of a special diet. These attempts are documented in the following references: W. C. Rose, 8 *Fed.Proc.* 546 (1949); C. Giordano, 62 *J. Lab. Clin. Med.* 231 (1963); C. Giordano et al., 45 *J Clin. Invest.* 1013 (1966) and N.G. DeSanto et al., 15 *Biochim. Appl.* 556 (1968). According to such proposals essential amino acids were administered to the uremic patient as the only nitrogen source in addition to the diet nitrogen. During this treatment the patients were given amino acid nitrogen in rather small doses for the reason that considerable difficulties were involved with peroral administration of the essential amino acids because their bad taste could not be masked in an acceptable manner by incorporation into tablets coated with chocolate or similar flavorful substances. When coatings were used, a large number of tablets were required to be administered since the material of the coating in such a case was the dominant component in the tablet. Quite frequently peroral administration caused nausea and vomiting. These difficulties often caused interruption of the treatment. Patients participating in the tests often were given egg proteins corresponding essentially to the same nitrogen quantity. Although a certain reduction of the blood urea nitrogen (BUN) was obtained, only a slight positive nitrogen balance was observed. It did not exceed the value of 1 gram of nitrogen accumulation per day. The result and the effect of this previous treatment method was so unsatisfactory that in several cases the patients had to be treated at the same time by dialysis.

According to one embodiment of the present invention it is possible to administer nitrogen intravenously to patients suffering from renal insufficiency or a very reduced kidney function. At the same time a considerable lowering of the blood urea nitrogen content is obtained in combination with a very pronounced nitrogen accumulation. This nitrogen accumulation may attain about 6 grams or more per day. One of the most important advantages of the amino acid solutions according to the invention is that such a lowering of the blood urea nitrogen in combination with a positive nitrogen accumulation often makes it possible to eliminate or postpone the dialysis treatment of the patient which was inevitable according to previous methods of treatment. These effects must be considered as unexpected and are to be regarded as a very important medical development.

A further advantage obtained by the use of the amino acid solution according to the invention is that a pronounced improvement in the general condition of the patients with a lowering of the concentration of accumulated protein decomposition products is obtained. A further unexpected advantage obtained by the use of the solutions according to the invention is that the improvement in the general condition of the patient continues even after the interruption of the treatment. This is a very important advantage which is not achieved by means of previously known means and methods of treatment.

The amino acid solutions according to the present invention contain preferably from about 2.5 to about 15.0 grams per liter of nitrogen originating from essential and semi-essential amino acids. The solutions contain a mixture of essential amino acids in approximately the following molar proportions:

0.0130–0.0850 moles of L-phenyl alanine
0.0165–0.1050 moles of L-leucine
0.0145–0.0900 moles of L-methionine
0.0025–0.0200 moles of L-tryptophan
0.0105–0.0700 moles of L-isoleucine
0.0110–0.0700 moles of L-lysine
0.0080–0.0550 moles of L-threonine
0.0135–0.0850 moles of L-valine per liter. In addition thereto it is also possible to incorporate 0.0125–0.0800 moles of L-arginine
0.0070–0.0450 moles of L-histidine per liter.

According to a particularly preferred embodiment the solutions contain:

0.0375–0.0675 moles of L-phenyl alanine
0.0500–0.0850 moles of L-leucine
0.0425–0.0750 moles of L-methionine
0.0075–0.0125 moles of L-tryptophan
0.0300–0.0550 moles of L-isoleucine
0.0325–0.0575 moles of L-lysine
0.0225–0.0425 moles of L-threonine
0.0400–0.0700 moles of L-valine per liter. These solutions may also be given a content of 0.0375–0.0650 moles of L-arginine
0.0200–0.0375 moles of L-histidine per liter. Preferably L-histidine is the only semi-essential amino acid added. The basic amino acid L-histidine is preferably dissolved in the form of an acetate to prevent the development of acidosis which can occur if the chloride form is used.

The pH of the solutions is adjusted to fall within the range of 4.9 to 7.0 by addition of a pharmaceutically acceptable acid. Acids which are decomposed by the body to water and carbonic acid, i.e. organic acids containing only carbon, oxygen and hydrogen, e.g. acetic acid, lactic acid and the like, are preferred. The pH range may be extended up to 7.0, and preferably the pH is adjusted to 6.0–7.0 to be more compatible with physiological pH. The preferred acid for the adjustment of the pH is acetic acid. Hydrochloric acid normally should not be used since it may be dangerous in acidotic cases. Acetic acid, on the other hand, has no influence on the acid-base balance in the body.

The preparations according to the invention are primarily intended for the treatment of those uremic conditions which are related to kidney damage or a reduced kidney function but may, of course, be used in other conditions where nitrogen nutrition is appropriate, e.g., in catabolic conditions. To obtain the best results patients should be placed on a low nitrogen (low protein) diet prior to and during treatment. The protein content of the diet should not exceed about 3.0 g per day, and the daily calorie intake should be between 2,000 and 3,000 calories.

The invention is illustrated by the following Examples:

EXAMPLE 1

A mixture of L-arginine, L-phenyl alanine, L-histidine, L-isoleucine, L-leucine, L-lysine, L-methionine, L-threonine, L-tryptophan and L-valine in quantities corresponding to a final content of 0.0375 moles of L-arginine, 0.0400 moles of L-phenyl alanine, 0.0215 moles of L-histidine, 0.0320 moles of L-isoleucine, 0.0505 moles of L-leucine, 0.0330 moles of L-lysine, 0.0445 moles of L-methionine, 0.0255 moles of L-threonine, 0.0075 moles of L-tryptophan and 0.0415 moles of L-valine per liter was dissolved with stirring in 50 liters of sterile water, whereafter sterile water was added up to about 90 liters. The pH value was adjusted to 6.0 by addition of acetic acid. The volume of the solution was then adjusted to 100 liters by addition of sterile water and sterile filtered nitrogen was bubbled through the solution in order to make it free from oxygen. The solution thus obtained was filtered and placed in infusion bottles under nitrogen atmosphere whereafter the bottles were sterilized by heating in an autoclave at 120°C for about 10 minutes.

EXAMPLE 2

A mixture of L-arginine, L-phenyl alanine, L-histidine, L-isoleucine, L-leucine, L-lysine, L-methionine, L-threonine, L-tryptophan and L-valine in quantities corresponding to a final content of 0.0630 moles of L-arginine, 0.0665 moles of L-phenyl alanine, 0.0355 moles of L-histidine, 0.0535 moles of L-isoleucine, 0.0840 moles of L-leucine, 0.0550 moles of L-lysine, 0.0740 moles of L-methionine, 0.0420 moles of L-threonine, 0.0110 moles of L-tryptophan and 0.0685 moles of L-valine per liter was dissolved with stirring in 50 liters of sterile water, whereafter sterile water was added up to about 90 liters and then the pH value of the solution was adjusted to 6.0–6.5 by addition of concentrated acetic acid. The volume of the solution was then adjusted to 100 liters by addition of sterile water and finally sterile filtered nitrogen was bubbled through the solution in order to make it free from oxygen. The solution thus obtained was filtered and filled into infusion bottles under nitrogen atmosphere whereafter the bottles were sterilized by heating in an autoclave at 120°C for 15 minutes.

EXAMPLE 3

Example 2 was repeated but L-arginine was omitted from the solution. In this way a solution containing L-histidine as the only semi-essential amino acid was obtained.

EXAMPLE 4

A mixture of 5.25 grams of L-isoleucine, 8.25 grams of L-leucine, 6.00 grams of L-lysine acetate (equivalent to L-lysine), 8.25 grams of L-methionine, 8.25 grams of L-phenyl alanine, 3.75 grams of L-threonine, 1.88 grams of L-tryptophan, 6.00 grams of L-valine, and 4.12 grams of L-histidine were dissolved in one liter of sterile water. The pH was adjusted to 6.7 by addition of acetic acid. A 400 ml aliquot contained 2.6 grams of amino acid nitrogen and 18 milliequivalents of acetate. Persons of normal or robust stature may receive a dosage of 400 ml per 24 hours whereas persons of small stature may receive 200 ml per 24 hours. The total infusion time should not be less than 4 and 3 hours, respectively. Larger doses of 600–800 ml in 5–6 hours for a 4–5 day period may be used if necessary. Stabilization of the blood urea nitrogen content to as low a level as possible often requires daily infusions for a 2- to 3-week period.

EXAMPLE 5

The patient was a 48-year old man with terminal chronic renal failure due to interstitial nephritis (abuse of phenacetin-containing anodynes). He had been treated twice with peritoneal dialysis. On admission his plasma urea nitrogen was 110 mg per 100 ml and the plasma creatinine 11.2 mg per 100 ml. Endogenous creatinine clearance was repeatedly found to be less than 3 ml per minute. He was initially given a diet containing 2.7 g of nitrogen per day. A regimen with a very low nitrogen content (less than 0.3 g per day) was then instituted. This regimen was based on concentrated flavored carbohydrate solutions (e.g. Hycal) and protein-free bread and butter, altogether corresponding to 2000 ±100 kcal and 0.1–0.3 g of nitrogen per day.

After 6 days on this diet (of which the last 4 days constituted period I) intravenous administration of the following solution of essential amino acids was started:

| Amino acid | CONCENTRATION | |
|---|---|---|
| | g/liter | g-Nitrogen/liter |
| L-isoleucine | 5.25 | 0.56 |
| L-leucine | 8.25 | 0.88 |
| L-lysine acetate | 6.00 | 1.16 |
| L-methionine | 8.25 | 0.75 |
| L-phenyl alanine | 8.25 | 0.70 |
| L-threonine | 3.75 | 0.44 |
| L-tryptophan | 1.88 | 0.25 |
| L-valine | 6.00 | 0.71 |

An alternative addition was L-histidine neutralized by acetic acid) with a concentration in the solution of about 4.12 g/liter and 1.12 g N/liter.

Four hundred ml of the solution, corresponding to 2.2 g of nitrogen were given daily which represented 3 times the "minimum requirement." During the first 4-day period of amino acid administration (Period II in Table I given below) 1.65 g of L-histidine (dissolved as acetate), corresponding to 0.45 g of nitrogen, was added to the infused amino acids. During consecutive 4- or 6-day periods (III – VI) the essential amino acids were given alternatively with and without addition of histidine. Period VI was followed by 1 day without any infusion (Period VII) and during the subsequent period (VIII), L-histidine was replaced by an isonitrogenous amount of L-proline. This was followed by a final period, (IX), when L-histidine was again added to the essential amino acids. After the study the patient was referred to training for home dialysis.

The total body water was determined twice during the study using tritium-labelled water and liquid scintillation counting. The nitrogen balance was corrected for changes in total body urea which was assumed to be evenly distributed in the body water. The blood samples for urea determination were taken in the morning before the start of the infusion. Urea was determined enzymatically in plasma and urine. Total nitrogen in urine and stools was determined by the micro-Kjeldahl method.

The patient's general condition improved markedly during the treatment. He reported feeling an increase in muscular strength, disappearance of fatigue and anorexia and a decrease of paresthesia in the legs.

With the patient's diet containing 2.7 g of nitrogen the plasma urea nitrogen rapidly decreased to 71 mg per 100 ml.

The intial period of protein-free diet (I) brought about a further rapid decrease in plasma urea nitrogen. The decrease in urea nitrogen continued during the following 4-day period (II), when essential amino acids and L-histidine were infused daily. The nitrogen balance was not determined during this period. Subsequently, the balance was found to be positive over the whole study, except for 1 day (VII) when no amino acids were given. However, the balance was more positive during the periods when histidine was added to the solution, as compared with periods without histidine when only essential amino acids without histidine were infused. Since these days followed immediately after a period when histidine was included, this elevation was probably due to an overlap of the histidine effect. In order to exclude overlap effects from one period to the next and also to obtain periods of comparable length, the nitrogen balance for the periods V, VI and VII was calculated not only for the entire period (a) but also for the three or four last days of the period (b), omitting the days when overlapping may have occurred.

The influence of L-histidine on the balance became more significant when the nitrogen balance was corrected for changes in the total urea pool. The difference in nitrogen balance between periods with and without L-histidine was greater than could be accounted for by the extra nitrogen supplied as histidine. Addition of L-proline to the essential amino acids failed to give as strong a positive balance as the addition of histidine. Plasma urea decreased during each period when L-histidine was added, whereas it tended to rise in the L-histidine-free periods.

Plasma creatinine concentration remained at the same high level throughout the study. Body weight and total body water volume remained constant. The following quantitative results were obtained:

TABLE 1

| Period | Day number | No. of days | Amino acids infused | Mean total N-intake inf.+food (g/day) | Primary mean N balance (g/day) | Corrected N balance (g/day) | Plasma urea N (g/100 ml) (start-end) |
|---|---|---|---|---|---|---|---|
| I | 1–4 | 4 | 0 | 0.06 | −3.80 | −1.33 | 71–45 |
| II | 5–8 | 4 | EAA+H | 2.86 | — | — | 45–30 |
| III | 9–12 | 4 | EAA | 2.45 | +0.47 | +0.88 | 30–26 |
| IV | 13–16 | 4 | EAA+H | 2.90 | +1.17 | +1.47 | 26–23 |
| Va | 17–22 | 6 | EAA | 2.38 | +0.66 | +0.25 | 23–29 |
| Vb | 19–22 | 4 | EAA | 2.37 | +0.48 | +0.07 | 25–29 |
| VIa | 23–28 | 6 | EAA+H | 2.91 | +1.04 | +1.38 | 29–24 |
| VIb | 25–28 | 4 | EAA+H | 2.91 | +1.05 | +1.46 | 28–24 |
| VII | 22 | 1 | 0 | 0.10 | −1.37 | −1.78 | 24–25 |
| VIIIa | 30–33 | 4 | EAA+P | 2.85 | +0.69 | +0.59 | 25–26 |
| VIIIb | 30–33 | 3 | EAA+P | 2.85 | +0.62 | +0.76 | 27–26 |
| IX | 34–36 | 3 | EAA+H | 2.85 | +1.08 | +1.76 | 26–21 |

Mean daily nitrogen balance of the patient during intravenous amino acid administration. Corrected nitrogen balance means that the primary balance is corrected for changes of body urea calculated from changes of plasma urea nitrogen concentration multiplied by body water volume. EAA = essential amino acids, H = L-histidine, P = L-proline.

administration.

In all three periods when histidine was given and the nitrogen balance determined (IV, VI, IX), the effect on the balance was already apparent on the first day of administration. On the other hand, the balance was still moderately elevated on the first two days of period V,

EXAMPLE 6

Patients were given a diet containing about 2.2 g of nitrogen per day and 2.400 kcal/day and were also infused with an intravenous solution of essential amino acids (in acetate form). No L-histidine or L-arginine were included. The daily dose was 2.2 g. The following results were obtained:

TABLE II

| Case | Sex | Age | Diagnosis | Endogen creatinine clearance (ml/min) | Body weight (kg) | Total body water 1 | Days | P.U-N* (mg/100 ml) Before | P.U-N* (mg/100 ml) After | Plasma creatinine (mg/100 ml) Before | Plasma creatinine (mg/100 ml) After | Nitrogen balance (g N/day) Non-corrected | Nitrogen balance (g N/day) Corrected |
|---|---|---|---|---|---|---|---|---|---|---|---|---|---|
| 1 | M | 51 | P.C.K. | <5 | 75 | 45 | 3 | 148 | 136 | 16 | 16 | −3.3 | −1.5 |
| 2 | F | 36 | P.C.K. | 5 | 61 | *32 | 6 | 75 | 55 | 10 | 10 | −2.3 | −1.1 |
| 3 | F | 56 | C.P. | <5 | 74 | *31 | 4 | 105 | 103 | 18 | 18 | −1.8 | −1.5 |
| 4 | F | 49 | P.C.K. | <5 | 51 | *28 | 5 | 71 | 68 | 12 | 13 | −1.4 | −1.2 |
| 5 | F | 54 | P.C.K. | 6 | 58 | *34 | 4 | 100 | 88 | 13 | 12 | −3.5 | −2.5 |
|   |   |   |   | 5 | 58 | *34 | 4 | 79 | 51 | 11 | 11 | −1.5 | +0.9 |
| 6 | F | 37 | C.P. | <5 | 45 | 25 | 4 | 156 | 114 | 12 | 10 | −4.3 | −1.7 |
|   |   |   |   | <5 | 45 | 25 | 1 | 100 | 99 | 12 | 12 | −2.3 | −2.1 |
| 7 | F | 67 | C.P. | <5 | 56 | 31 | 3 | 133 | 115 | 12 | 11 | −1.4 | +0.4 |

Table II — Continued

| 8 | M | 47 | C.G. | 5 | 67 | 40 | 3 | 92 | 75 | 11 | 11 | −3.6 | −1.2 |
|---|---|----|------|---|----|----|---|----|----|----|----|------|------|
|   |   |    |      | 5 | 67 | 40 | 4 | 95 | 71 | 14 | 12 | −3.3 | −0.9 |
| 9 | F | 40 | P.C.K. | <5 | 62 | $^x$34 | 4 | 104 | 84 | 13 | 14 | −2.1 | −0.3 |
| 10 | F | 50 | C.P. | 7 | 59 | 32 | 9 | 75 | 34 | 8 | 7 | −0.9 | +0.5 |
| 11 | F | 47 | C.G. | <5 | 49 | 27 | 12 | 114 | 69 | 12 | 13 | −2.0 | −0.9 |
| 12 | F | 32 | C.G. | <5 | 56 | 31 | 4 | 111 | 95 | 12 | 12 | −3.1 | −1.8 |
| 13 | F | 22 | C.G. | <5 | 54 | $^x$30 | Not studied | | Not studied | | Not studied | | Not studied |
| 14 | F | 23 | C.G. | <5 | 52 | $^x$29 | Not studied | | Not studied | | Not studied | | Not studied |
| 15 | M | 37 | A.N. | <5 | 54 | $^x$33 | Not studied | | Not studied | | Not studied | | Not studied |
| 16 | F | 50 | P.C.K. | <5 | 56 | 30 | Not studied | | Not studied | | Not studied | | Not studied |

Clinical data. Protein-poor diet (2.7 g N/day). P.C.K. = Polycystic kidney disease. C.P. = Chronic pyelonephritis. C.G. = Chronic glomerulonephritis. A.N. = Analgetic nephritis. $x$ = Determined by tritiated water. *P.U−N = Plasma urea nitrogen.

EXAMPLE 7

Patients were infused with a solution of the essential amino acids of Example 6 supplemented with 0.45 g per dose of L-histidine.

Table III gives the results:

TABLE III

| Case | Body weight (kg) | Total body water 1 | Days | A.A. g N/day | P.U−N* (mg/100 ml) Before | After | Plasma creatinine (mg/100 ml) Before | After | Nitrogen balance (g N/day) Non-corrected | Corrected |
|---|---|---|---|---|---|---|---|---|---|---|
| 1 | 61 | $^x$32 | 7 | 2.19 | 55 | 51 | 10 | 10 | 1.1 | 1.3 |
| 2 | 74 | $^x$31 | 8 | 2.19 | 103 | 83 | 18 | 19 | 1.3 | 2.1 |
| 3 | 52 | $^x$29 | 9 | 2.19 | 57 | 61 | 13 | 12 | 1.6 | 1.4 |
| 4 | 75 | 45 | 6 | 3.7 | 136 | 120 | 16 | 17 | 0.7 | 1.7 |
| 5 | 56 | $^x$30 | 5 | 1.1 | 49 | 42 | 11 | 13 | 1.1 | 1.5 |

Protein-poor diet (2.7 g N/day) supplied with essential l-amino acids (2.19 g N) infused daily. A.A. = l-amino acids. P.U−N* = Plasma urea nitrogen. $x$ = Determined by tritiated water.

EXAMPLE 8

Thirty-three severe uremic patients were treated with a low protein diet (2.7 g of nitrogen/day) and various kinds of amino acid solutions including patients with BUN up to 150 mg percent and serum creatinine levels up to 15 mg percent and with creatinine clearance rates of less than 7 ml/min. A total number of 54 periods of treatment were performed, and 41 of these were classified as successful. A successful treatment period refers to a stationary or declining BUN and an amelioration of the nitrogen balance. In most treatment periods the nitrogen balance was followed and a positive nitrogen balance usually obtained after intravenous amino acid infusion. Nitrogen balances which were initially at a negative level of 3–5 g of nitrogen per 24 hours in many cases became positive at a level of 2–5 g of nitrogen per 24 hours. A summary of the results of treatments can be seen in the table below.

In the initial studies the eight essential amino acids together with the "semi-essential" amino acids arginine and histidine were given to a number of uremic patients. In a subsequent series of treatments only the eight essential amino acids were given which resulted in an improved lowering effect on BUN, but still the nitrogen balances were not satisfactory. It was then shown that if histidine was given together with the essential amino acids an improvement in nitrogen balance could be demonstrated in most cases and a good effect maintained on the BUN. For these reasons further studies have been carried out with Solution I containing the eight essential amino acids and histidine. At present a total of 15 uremic patients have been treated in 20 treatment periods and of these 16 have been considered successful. In the few cases under treatment who did not respond to therapy it was always obvious that lack of response was associated with intercurrent disease or deviation from the diet, etc.

Isotope ($N^{15}$) studies have shown that following treatment with a low-protein diet and intravenously administered amino acids, a protein synthesis takes place in uremic patients. On the basis of these isotope studies regular treatment with Solution I has been established in all kinds of dialytic treatment. Up to now 823 infusions of Solution I have been given to 44 uremic patients on long-term hemodialysis, and long-term and short-term peritonealdialysis.

| Amino acid solutions (400 ml N-content) | Patients | Infusion given | Treatment periods | Results Successful treatment period | Unsuccessful treatment period |
|---|---|---|---|---|---|
| I. essential amino acids 2.19 g N and histidine 0.44 g N (chloride-free) | 15 | 286 | 20 | 16 | 4 |
| II. a) essential amino acids 2.19 g N and arginine 1.15 g N and histidine 0.44 g N<br>b) essential amino acids 2.19 g N and histidine 0.44 g N | 22 | 332 | 32 | 25 | 7 |

| Kind of treatment | Patients | Infusions with Solution I |
|---|---|---|
| Long-term hemodialysis | 14 | 377 |
| Long-term and short-term peritonealdialysis | 30 | 446 |
| Total | 44 | 823 |

EXAMPLE 9

A 47-year old man with chronic glomerulonephritis and uremia, BUN about 110 mg percent, creatinine clearance about 7 ml/min. was given a low-protein diet for 4 days. Continuing the diet he was treated on day 5 with daily intravenous infusions of a solution of essential amino acids with L-histidine and L-arginine. His BUN decreased and the nitrogen balance became positive. On days 14 and 15 he was given the solution by stomach tube. The BUN rose and decreased only when intravenous infusions were resumed. Table IV summarizes the general results obtained:

TABLE IV

| Day | BUN mg/100 ml | N-balance g N/day | Serum creatinine mg/100 ml |
|---|---|---|---|
| 1 | 98 | −4.2 | 13.0 |
| 5 | 70 | +0.8 | 12.0 |
| 7 | 66 | +1.7 | 12.0 |
| 9 | 62 | +2.0 | 11.0 |
| 10 | na | −1.7 | na |
| 11 | na | −1.6 | na |
| 12 | 58 | +1.8 | 11.5 |
| 14 | 56 | +0.4 | 13.5 |
| 15 | 60 | +1.8 | 10.0 |
| 16 | 80 | na | 10.0 |
| 17 | 78 | +1.6 | 9.8 |
| 19 | 64 | na | 9.8 |

EXAMPLE 10

A woman, 23 years old, was treated for 18 days by intravenous transfusion. She had severe uremia and a creatinine clearance of about 5 ml/min. Table V summarizes the general results obtained:

TABLE V

| Day | BUN mg/100 ml | N-balance g N/day | Plasma creatinine mg/100 ml |
|---|---|---|---|
| 1 | 115 | +2.0 | 10.0 |
| 2 | 100 | na | 10.2 |
| 3 | 108 | +0.8 | 9.8 |
| 4 | 102 | +1.8 | 10.6 |
| 5 | 98 | +0.8 | 9.8 |
| 6 | 86 | +1.8 | 9.4 |
| 7 | 84 | +2.0 | 9.0 |
| 8 | 84 | +2.4 | 9.0 |
| 9 | 80 | +2.0 | 9.6 |
| 10 | 76 | +2.2 | 9.0 |
| 11 | na | +2.4 | 8.8 |
| 12 | 68 | +2.0 | 8.6 |
| 13 | 64 | +2.4 | 8.8 |
| 14 | 62 | +2.2 | 8.6 |
| 15 | 62 | +2.4 | 8.4 |
| 16 | 60 | +3.0 | 8.8 |
| 17 | 58 | +2.8 | 9.8 |
| 18 | na | na | 9.6 |
| 19 | 60 | na | 9.6 |

EXAMPLE 11

A 23-year old woman had chronic glomerulonephritis and a creatinine clearance of about 3 ml/min. Daily infusions of a solution of essential amino acids plus histidine and arginine (3.7 g of nitrogen per day) were given for 7 days followed by the same quantities of essential amino acids only (2.19 g of nitrogen per day for 8 days). The BUN stabilized itself at a level of about 50 mg percent and the nitrogen balance remained slightly positive. Nitrogen loss with the feces was not deducted. When only L-histidine was added to the solution of essential amino acids the balance improved without any increase of the blood urea level. Table VI summarizes the general results obtained:

TABLE VI

| Day | BUN mg/100 ml | N-balance g N/day | Plasma creatinine mg/100 ml |
|---|---|---|---|
| 1 | 98 | na | 13.5 |
| 2 | 76 | +2.1 | 12.5 |
| 3 | 76 | +2.3 | 12.5 |
| 4 | 70 | +2.2 | 14.5 |
| 5 | 62 | +3.8 | 14.4 |
| 6 | 60 | +3.4 | 12.2 |
| 7 | 56 | +3.0 | 11.6 |
| 8 | 58 | +1.5 | 12.8 |
| 9 | 60 | +1.6 | 11.8 |
| 10 | 55 | +1.5 | 12.2 |
| 11 | 54 | +1.4 | 11.2 |
| 12 | 54 | +2.2 | 11.8 |
| 13 | 52 | +1.6 | 11.2 |
| 14 | 55 | +1.9 | 12.0 |
| 15 | 60 | +1.8 | 12.2 |
| 16 | 58 | +0.7 | 12.0 |
| 17 | 58 | +2.4 | 10.6 |
| 18 | 50 | +2.8 | 10.8 |
| 19 | 49 | +2.5 | 11.2 |
| 20 | 48 | +1.7 | 11.0 |
| 21 | 50 | +2.4 | 11.8 |
| 22 | 52 | +2.4 | 10.6 |
| 23 | na | na | 11.8 |
| 24 | na | na | 12.4 |

According to another embodiment of the present invention it is also possible to administer nitrogen perorally to patients suffering from renal insufficiency or a very reduced kidney function. It has now been found that the intervals between the treatment with intravenous nitrogen addition solutions can be considerably prolonged by oral administration of nitrogen nutrition to the patients by using chloride-free tablets formed from the disclosed mixture of essential amino acids during the period of time immediately following the time for the intravenous nitrogen addition. By this technique a better utilization of the treatment resources in the hospital is achieved, and the treatment of the uremic conditions from the patient's point of view is considerably simplified since the intervals are prolonged between the hospital treatments. These effects must be considered as unexpected and are to be regarded as an important medical innovation with regard to the shortage of hospital beds and the great need of treatment actually required.

The tablets which are prepared according to the invention suitably contain a mixture of essential amino acids in the following internal molar proportions:

0.0130–0.0850 moles of L-phenyl alanine
0.0165–0.1050 moles of L-leucine
0.0145–0.0900 moles of L-methionine
0.0025–0.0200 moles of L-tryptophan
0.0105–0.0700 moles of L-isoleucine
0.0110–0.0700 moles of L-lysine acetate
0.0080–0.0550 moles of L-threonine
0.0135–0.0850 moles of L-valine.

A preferred range is:

0.0375–0.0675 moles of L-phenyl alanine
0.0500–0.0850 moles of L-leucine
0.0425–0.0750 moles of L-methionine
0.0075–0.0125 moles of L-tryptophan
0.0300–0.0550 moles of L-isoleucine
0.0325–0.0575 moles of L-lysine acetate
0.0225–0.0425 moles of L-threonine
0.0400–0.0700 moles of L-valine.

Furthermore, it is also possible to incorporate in the tablet the semi-essential amino acids L-arginine and L-histidine in the following internal molar proportions:

0.0125–0.0800 moles of L-arginine
0.0070–0.0450 moles of L-histidine.

A preferred range for these components is:
0.0375–0.0650 moles of L-arginine
0.0200–0.0375 moles of L-histidine.

The additon of L-histidine is particularly advantageous for achievement of a good treatment result and may be considered as an essential amino acid to uremic patients. If necessary, basic amino acids are present in the acetate form since the chlorides may cause acidosis to develop.

According to a particularly preferred embodiment, tablets are prepared comprising:

0.110 g L-leucine
0.025 g L-tryptophan
0.110 g L-methionine
0.110 g L-phenyl alanine
0.070 g L-isoleucine
0.113 g L-lysine acetate
0.050 g L-threonine
0.080 g L-valine
0.055 g L-histidine per tablet unit. A typical tablet unit will weigh from about 0.73 g to 0.81 g.

The mixture may be a film-coated tablet, may be placed in capsule form or may be in any other suitable dosage form. One daily dose of nitrogen generally corresponds to about 30 tablets with the above-given composition.

The invention is illustrated by the following working examples illustrating the preparation of the tablet. The examples set forth the various components in weight units which fall within the disclosed range of molar proportions:

EXAMPLE 12

(Composition of 10,000 tablets)

| | |
|---|---|
| L-isoleucine | 700 g |
| L-leucine | 1,100 g |
| L-lysine acetate (corresponds to 800 g L-lysine) | 1,130 g |
| L-methionine | 1,100 g |
| L-phenyl alanine | 1,100 g |
| L-threonine | 500 g |
| L-tryptophan | 250 g |
| L-valine | 800 g |

All the above substances are ground through a 1 mm sieve and are mixed together. The powder mixture is moistened with a binder solution of 150 g polyvinylpyrrolidone in 1,200 g of 50 percent ethanol, and the solvent is removed by drying in a fan cupboard at 50°C. The dried mash is ground through a 2 mm sieve, is mixed with starch and 80 g of magnesium stearate and is compressed into tablets with a weight of about 0.73–0.81 g in an excenter or rotating tabletting machine. The disintegrating time of the tablets is determined according to the process described in the British Pharmacopaeia. In order to conceal the offensive taste of the tablets they are sprayed with a composition comprising polyvinyl acetate and polyethylene glycol until a thin protective film is formed around them. The polyethylene glycol is commercially available under the trade name "Macrogol 6000."

EXAMPLE 13

(Composition for 10,000 tablets)

| | |
|---|---|
| L-isoleucine | 700 g |
| L-leucine | 1,100 g |
| L-lysine acetate (corresponds to 800 g L-lysine) | 1,130 g |
| L-methionine | 1,100 g |
| L-phenyl alanine | 1,100 g |
| L-threonine | 500 g |
| L-tryptophan | 250 g |
| L-valine | 800 g |
| L-histidine | 550 g |

All substances are ground through a 1 mm sieve and are mixed together. The powdered mixture is moistened with a binder solution of 150 g polyvinyl pyrrolidone in 1,200 g of 50 percent ethanol, and the solvent is removed by drying in a fan cupboard at 50°C. The dried mash is ground through a 2 mm sieve, is mixed with starch and 80 g of magnesium stearate and is compressed into tablets with a weight of about 0.76 g in an excenter- or rotating tabletting machine. The disintegrating time of the tablets is determined according to the process described in the British Pharmacopaeia. In order to mask the unpalatable taste of the tablets they are coated with a thin film of polyvinyl acetate and polyethylene glycol by a spray process as described above.

EXAMPLE 14

(Preparation of 10,000 tablets)

In the first step a mixture of:

| | |
|---|---|
| L-leucine | 1,100 g |
| L-lysine acetate (corresponding to 800 g L-lysine) | 1,130 g |
| lactose | 500 g | is ground through a sieve (1.5 mm) and is mixed in a panetary mixer or other suitable machine. The powder mixture is moistened with a solution of 50 to 100 g polyvinyl pyrrolidone dissolved in 700 to 800 g ethanol (95 vol percent) and the moistened mass is pressed through a 2 to 10 mm sieve, preferably 4 mm, in an oscillating granulator or other suitable mill. The alcohol is then dried off at 40° – 60°C, and the dried material is ground through a 1 to 2 mm sieve.

In the second step a mixture of:

| | |
|---|---|
| L-isoleucine | 700 g |
| L-methionine | 1,100 g |
| L-phenyl alanine | 1,100 g |
| L-threonine | 500 g |
| L-tryptophan | 250 g |
| L-valine | 800 g | is treated as mentioned above. The quantity of polyvinyl pyrrolidone added is 75 to 150 g dissolved in 800 g to 1,000 g ethanol (95 vol percent).

In a third step the two granules prepared in the two preceding steps are mixed together with 70–100 g magnesium stearate as a lubricant, and the final mixture is compressed in a single punch machine and a rotary machine into tablets with a weight of 0.73–0.76 g.

The tablets are spray-coated with a solution comprising:

| | Parts by Weight |
|---|---|
| polyvinyl acetate | 1.5 – 3.0 |
| polyethylene glycol | 6.0 – 9.0 |
| ethanol (95 vol %) | 88.0 – 92.5 |

An airless spray gun may be used to apply the coating solution. The 10,000 tablets can be sprayed with 1,400 g to 1,800 g of the solution.

EXAMPLE 15

(Preparation of 10,000 tablets)

| | |
|---|---|
| L-histidine | 550 g |
| L-leucine | 1,100 g |

L-lysine acetate
(corresponding to 800 g
L-lysine                        1,130 g
lactose                           500 g are treated as described in the first step in Example 10 above. Thereafter steps corresponding to steps 2 and 3 as described in Example 14 were carried out to yield tablets with a weight of 0.78 – 0.81 g. The tablets were coated with a solution of certified color, 3 percent.

We claim:

1. A mixture useful in providing nutrition for patients suffering from uremic conditions comprising essential amino acids in the following internal molar proportions:
   0.0130–0.0850 moles of L-phenyl alanine
   0.0165–0.1050 moles of L-leucine
   0.0145–0.0900 moles of L-methionine
   0.0025–0.0200 moles of L-tryptophan
   0.0105–0.0700 moles of L-isoleucine
   0.0110–0.0700 moles of L-lysine
   0.0080–0.0550 moles of L-threonine
   0.0135–0.0850 moles of L-valine.

2. A mixture as claimed in claim 1 which further comprises L-histidine in the proportion of about 0.0070–0.0450 moles.

3. A mixture as claimed in claim 2 which further comprises L-arginine in the proportion of about 0.0125–0.0800 moles.

4. A mixture as claimed in claim 1 which comprises amino acids in the following proportions:
   0.0375–0.0675 moles of L-phenyl alanine
   0.0500–0.0850 moles of L-leucine
   0.0425–0.0750 moles of L-methionine
   0.0075–0.0125 moles of L-tryptophan
   0.0300–0.0550 moles of L-isoleucine
   0.0325–0.0575 moles of L-lysine
   0.0225–0.0425 moles of L-threonine
   0.0400–0.0700 moles of L-valine.

5. A mixture as claimed in claim 4 which further comprises 0.0200–0.0375 moles of L-histidine.

6. A mixture as claimed in claim 5 which further comprises 0.0375–0.0650 moles of L-arginine.

7. An infusion solution intended for intravenous nutrition comprising:
   0.0130–0.0850 moles of L-phenyl alanine
   0.0165–0.1050 moles of L-leucine
   0.0145–0.0900 moles of L-methionine
   0.0025–0.0200 moles of L-tryptophan
   0.0105–0.0700 moles of L-isoleucine
   0.0110–0.0700 moles of L-lysine
   0.0080–0.0550 moles of L-threonine
   0.0135–0.0850 moles of L-valine
per liter of solution in water, the pH of which solution being adjusted to fall within the interval 6.0 to 7.0 by addition of a pharmaceutically acceptable organic acid containing only carbon, oxygen and hydrogen.

8. An infusion solution according to claim 7, wherein the solution also contains 0.0125–0.0800 moles of L-arginine and 0.0070–0.0450 moles of L-histidine per liter.

9. An infusion solution according to claim 7, wherein the solution also contains 0.0070–0.0450 moles of L-histidine per liter.

10. An infusion solution according to claim 7, comprising:
    0.0375–0.0675 moles of L-phenyl alanine
    0.0500–0.0850 moles of L-leucine
    0.0425–0.0759 moles of L-methionine
    0.0075–0.0125 moles of L-tryptophan
    0.0300–0.0550 moles of L-isoleucine
    0.0325–0.0575 moles of L-lysine
    0.0225–0.0425 moles of L-threonine
    0.0400–0.0700 moles of L-valine
per liter of solution.

11. An infusion solution according to claim 10, wherein the solution also contains 0.0375–0.0650 moles of L-arginine and 0.0200–0.0375 moles of L-histidine per liter.

12. An infusion solution according to claim 10, wherein the solution also contains 0.0200–0.0375 moles of L-histidine per liter.

13. An infusion solution according to claim 7, wherein the pH of the solution is adjusted to fall within the interval 6.0 to 7.0 by addition of a pharmaceutically acceptable organic acid.

14. An infusion solution according to claim 7, wherein the pH of the solution is adjusted to fall within the interval 6.0 to 7.0 by addition of acetic acid.

15. Method for the treatment of uremic conditions caused by renal insufficiency comprising administering by intravenous infusion to a patient a solution of:
    0.0130–0.0850 moles of L-phenyl alanine
    0.0165–0.1050 moles of L-leucine
    0.0145–0.0900 moles of L-methionine
    0.0025–0.0200 moles of L-tryptophan
    0.0105–0.0700 moles of L-isoleucine
    0.0110–0.0700 moles of L-lysine
    0.0080–0.0550 moles of L-threonine
    0.0135–0.0850 moles of L-valine
per liter of solution in water, the pH of which solution being adjusted to fall within the interval 6.0 to 7.0 by addition of a pharmaceutically acceptable organic acid containing only carbon, oxygen and hydrogen.

16. Method according to claim 15, wherein the solution also contains 0.0125–0.0800 moles of L-arginine and 0.0070–0.0450 moles of L-histidine per liter.

17. Method according to claim 15, wherein the solution also contains 0.0070–0.0450 moles of L-histidine per liter.

18. Method according to claim 15, wherein the solution comprises:
    0.0375–0.0675 moles of L-phenyl alanine
    0.0500–0.0850 moles of L-leucine
    0.0425–0.0750 moles of L-methionine
    0.0075–0.0125 moles of L-tryptophan
    0.0300–0.0550 moles of L-isoleucine
    0.0325–0.0575 moles of L-lysine
    0.0225–0.0425 moles of L-threonine
    0.0400–0.0700 moles of L-valine
per liter of solution.

19. Method according to claim 18, wherein the solution also contains 0.0375–0.0650 moles of L-arginine and 0.0200–0.0375 moles of L-histidine per liter.

20. Method according to claim 18, wherein the solution also contains 0.0200–0.0375 moles of L-histidine per liter.

21. Method according to claim 15, wherein the pH of the solution is adjusted to fall within the interval 6.0 to 7.0 by addition of a pharmaceutically acceptable organic acid, containing only carbon, oxygen and hydrogen.

22. Method according to claim 15, wherein the pH of the solution is adjusted to fall within the interval 6.0 to 7.0 by addition of acetic acid.

23. A method of treating uremic conditions in a patient comprising administering to the patient a tablet comprising essential amino acids in the following internal molar proportions:
   0.0130–0.0850 moles of L-phenyl alanine
   0.0165–0.1050 moles of L-leucine
   0.0145–0.0900 moles of L-methionine
   0.0025–0.0200 moles of L-tryptophan
   0.0105–0.0700 moles of L-isoleucine
   0.0110–0.0700 moles of L-lysine
   0.0080–0.0550 moles of L-threonine
   0.0135–0.0850 moles of L-valine.

24. A method as claimed in claim 23, in which the tablet further comprises a protective film.

25. A method as claimed in claim 24, in which the film comprises a compound selected from the group consisting of polyvinyl acetate and polyethylene glycol.

26. A method as claimed in claim 23, in which the tablet comprises essential amino acids in the following internal molar proportions:
   0.0375–0.0675 moles of L-phenyl alanine
   0.0500–0.0850 moles of L-leucine
   0.0425–0.0750 moles of L-methionine
   0.0075–0.0125 moles of L-tryptophan
   0.0300–0.0550 moles of L-isoleucine
   0.0325–0.0575 moles of L-lysine
   0.0225–0.0425 moles of L-threonine
   0.0400–0.0700 moles of L-valine.

27. A method as claimed in claim 26, in which the tablet further comprises a protective film.

28. A method as claimed in claim 27, in which the protective film comprises a compound selected from the group consisting of polyvinyl acetate and polyethylene glycol.

29. A tablet comprising essential amino acids in the following internal molar proportions:
   0.0130–0.0850 moles of L-phenyl alanine
   0.0165–0.1050 moles of L-leucine
   0.0145–0.0900 moles of L-methionine
   0.0025–0.0200 moles of L-tryptophan
   0.0105–0.0700 moles of L-isoleucine
   0.0110–0.0700 moles of L-lysine
   0.0800–0.0550 moles of L-threonine
   0.0135–0.0850 moles of L-valine.

30. A tablet as claimed in claim 29 which further comprises a protective film.

31. A tablet as claimed in claim 30, in which the protective film comprises a compound selected from the group consisting of polyvinyl acetate and polyethylene glycol.

32. A tablet as claimed in claim 29, comprising amino acids in the following internal molar proportions:
   0.0375–0.0675 moles of L-phenyl alanine
   0.0500–0.0850 moles of L-leucine
   0.0425–0.0750 moles of L-methionine
   0.0075–0.0125 moles of L-tryptophan
   0.0325–0.0575 moles of L-lysine
   0.0225–0.0425 moles of L-threonine
   0.0400–0.0700 moles of L-valine.

33. A tablet as claimed in claim 32, which further comprises a protective film.

34. A tablet as claimed in claim 32, in which the protective film comprises a compound selected from the group consisting of polyvinyl acetate and polyethylene glycol.

* * * * *